G. E. NEUBERTH.
VEHICLE SPRING.
APPLICATION FILED OCT. 10, 1910.

1,048,336.

Patented Dec. 24, 1912.

WITNESSES:
M. A. Johnson.
E. A. Pell

INVENTOR
George E. Neuberth,
BY
Wm H Campfield
ATTORNEYS

UNITED STATES PATENT OFFICE.

GEORGE E. NEUBERTH, OF NEWARK, NEW JERSEY.

VEHICLE-SPRING.

1,048,336. Specification of Letters Patent. Patented Dec. 24, 1912.

Application filed October 10, 1910. Serial No. 586,236.

*To all whom it may concern:*

Be it known that I, GEORGE E. NEUBERTH, a citizen of the United States, residing at Newark, in the county of Essex and State of New Jersey, have invented certain new and useful Improvements in Vehicle-Springs; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a vehicle spring which is adapted to absorb the shock incidental to riding over a rough surface, and consists of a spring which is connected to the axle of the vehicle, and to the body or chassis of the vehicle, in such a manner that a movement of the axle in an upward direction causes a simultaneous downward pull on the spring. In this way the shock or jar to which the axle is subjected is neutralized and the vehicle body rides smoothly and easily over the roughest pavements. The mechanism for pulling the spring downward when the axle moves upward makes its presence apparent most when the movement of the axle is sudden or violent, and this mechanism takes up the vibration and the spring is not subjected to severe strain. The device also acts to prevent the rebound or excess upward movement of a vehicle body after a depression has been traveled over.

The invention is illustrated in the accompanying drawing, in which—

Figure 1:
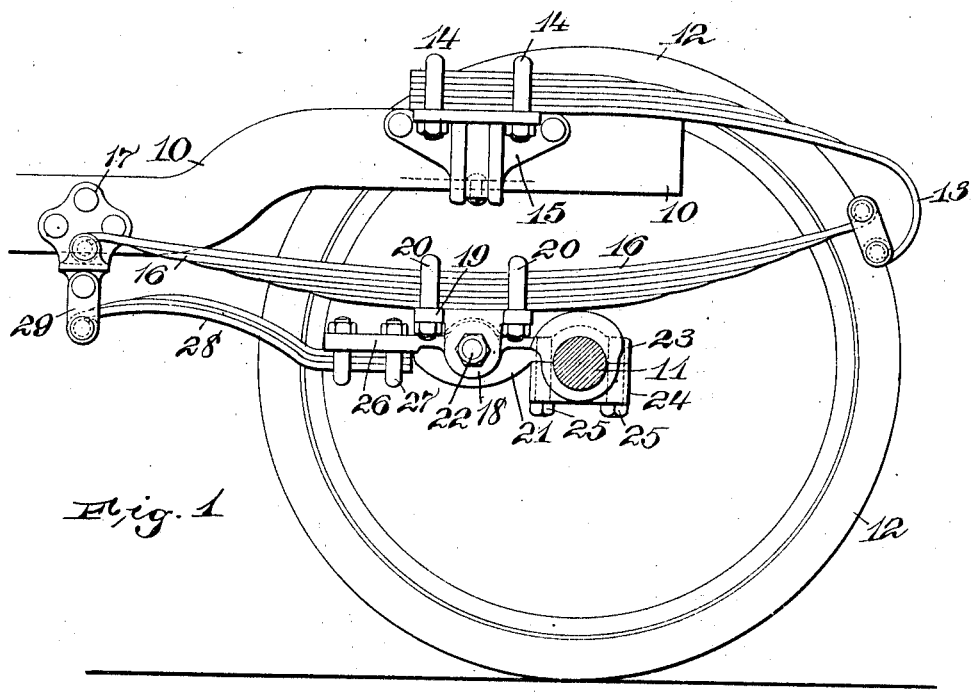
Figure 2:
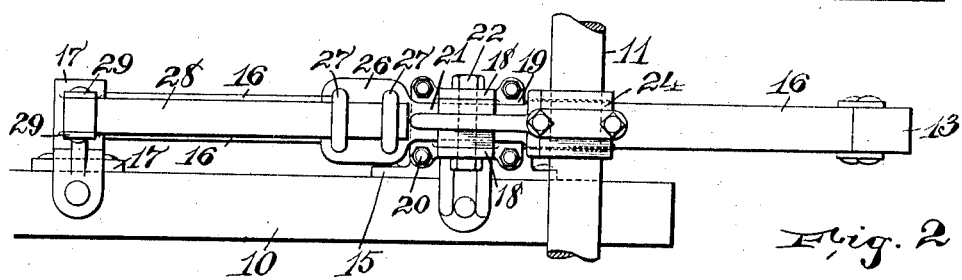

Figure 1 is a side view of a vehicle spring of my improved construction with a wheel removed to better illustrate the device. Fig. 2 is a bottom view of Fig. 1.

The illustration shows the spring attached to an automobile having any usual form of body or chassis 10 which is suitably mounted on axles 11, one of which is shown, and the wheels 12 support the axles. The main spring of the vehicle can be of any of the usual forms, and I illustrate a half elliptic spring 13 fastened to the body of the vehicle by clips 14 secured to a bracket 15. An elliptic spring 16 is fastened at one end to the spring 13, and at its other end to the body 10 by a bracket 17, the ends of the springs 13 and 16 being connected to each other and to the body of the vehicle in any way. A yoke 18 has a top plate 19 which supports the spring 16 between its ends, and clips 20 secure the spring to the plate. A saddle 21 fits in the yoke 18, being pivotally connected thereto by the bolt 22, one end of the saddle resting on the axle 11 and having the two-part end consisting of the head 23 and the clamp 24 so secured by the bolts 25 that the saddle can swing on the axle. The end of the saddle opposite the axle is formed into a plate 26 to which is attached, by clips 27, a supplemental spring 28, the projecting end of the spring 28 being connected to the body of the vehicle, and preferably to the bracket 17, by links 29.

It will be seen that to all intents and purposes the saddle 21 and the spring 28 form a lever which connects the axle of the vehicle and the body of the vehicle with a fulcrum, as at 22, between its ends, and I do not wish to be limited to the construction of lever illustrated and described herein.

When an obstruction is encountered by the wheel 12 it is forced upward with more or less violence and it immediately causes the lever, which consists, in the illustration, of the saddle 21 and the spring 28, to be tilted, the fulcrum of the lever being at the bolt 22, and the end of the lever which is connected to the body or spring of the vehicle is forced downward, overcoming the tendency of the body to move upward, and thus consuming or neutralizing the movement and preventing the upward motion of the axle and wheel to be communicated to the body. The lever also prevents the bounce or throw which is a result of the rebound after the vehicle has had a wheel, or wheels, pass through a depression in the road. The tendency in this case, of the body of the car to ride upward, is prevented by the lever which is subjected to an upward pull on the end which is secured to the vehicle, which pull is converted into a downward pressure on the axle and the wheel, and the wheel being on the ground and resisting downward pressure holds the body from moving upward beyond the resiliency of the lever.

The device can be attached to a vehicle now in use, that is, a vehicle can be easily converted to receive my improved spring by moving the spring slightly forward on the vehicle so that it is supported on the lever eccentrically to the axle.

Having thus described my invention, what I claim is:—

1. The combination with a vehicle, of a saddle secured at one end to the axle of the vehicle and having its free end formed into a plate, a supplemental leaf spring attached to the plate and projecting in extension thereof whereby the saddle and the spring form a lever with a gradual resiliency toward its end, the projecting end of the spring being secured to the body of the vehicle, the saddle and the spring being approximately the same length, and a main spring secured at its ends to the body of the vehicle and being supported at its center on the saddle substantially equi-distant between the axle and the supplemental spring.

2. The combination with a vehicle, of a saddle having a two-part end to pivotally secure the saddle to the axle of the vehicle, the saddle projecting in the form of a plate, a supplemental leaf spring attached in extension of the plate and forming with the saddle a spring lever, a bracket on the vehicle, links secured to the bracket and the supplemental spring, a yoke fitting pivotally over the saddle, and a spring resting on the yoke and attached at one end to the bracket and at its other end connected with the body of the vehicle.

In testimony that I claim the foregoing, I have hereunto set my hand this 8th day of October 1910.

GEORGE E. NEUBERTH.

Witnesses:
E. A. PELL,
M. A. JOHNSON.

Copies of this patent may be obtained for five cents each, by addressing the "Commissioner of Patents, Washington, D. C."